(12) United States Patent
Kuroda

(10) Patent No.: US 8,166,382 B2
(45) Date of Patent: Apr. 24, 2012

(54) DATA PROCESSING APPARATUS, METHOD OF REGISTERING ELECTRONIC DOCUMENT, AND COMPUTER PROGRAM

(75) Inventor: Ken Kuroda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1101 days.

(21) Appl. No.: 12/033,589

(22) Filed: Feb. 19, 2008

(65) Prior Publication Data

US 2008/0209363 A1 Aug. 28, 2008

(30) Foreign Application Priority Data

Feb. 23, 2007 (JP) ................................. 2007-043581

(51) Int. Cl.
*G06F 17/00* (2006.01)
(52) U.S. Cl. ....................................................... 715/200
(58) Field of Classification Search .................. 715/200, 715/255
See application file for complete search history.

(56) References Cited

U.S. PATENT DOCUMENTS

| | | | |
|---|---|---|---|
| 5,185,821 A * | 2/1993 | Yoda .............................. | 382/306 |
| 6,470,349 B1 * | 10/2002 | Heninger et al. .............. | 717/115 |
| 6,775,422 B1 * | 8/2004 | Altman .......................... | 382/305 |
| 7,783,072 B2 * | 8/2010 | Work et al. .................... | 382/100 |
| 7,864,347 B2 * | 1/2011 | Moran et al. ................. | 358/1.13 |
| 7,882,125 B2 * | 2/2011 | Tamura ......................... | 707/769 |
| 7,912,859 B2 * | 3/2011 | Takashima .................... | 707/783 |
| 8,015,164 B2 * | 9/2011 | Hamada ........................ | 707/694 |
| 8,069,243 B2 * | 11/2011 | Kunitake et al. .............. | 709/225 |
| 2002/0111916 A1 * | 8/2002 | Coronna et al. ................ | 705/64 |
| 2004/0131263 A1 * | 7/2004 | Kawamoto et al. ........... | 382/232 |
| 2005/0111040 A1 * | 5/2005 | Takagi .......................... | 358/1.16 |
| 2005/0195446 A1 * | 9/2005 | Kasatani ....................... | 358/402 |
| 2006/0061843 A1 * | 3/2006 | Sadakuni ...................... | 358/523 |
| 2007/0061337 A1 * | 3/2007 | Saito et al. ...................... | 707/10 |
| 2007/0084370 A1 * | 4/2007 | Kuroda ......................... | 101/404 |

(Continued)

FOREIGN PATENT DOCUMENTS

JP 2002-288196 A 10/2002

OTHER PUBLICATIONS

Flynn et al., The Satchel System Architecture: Mobile Access to Documents and Services, Google 2000, pp. 243-258.*

(Continued)

*Primary Examiner* — Cong-Lac Huynh

(74) *Attorney, Agent, or Firm* — Canon U.S.A., Inc. IP Division

(57) ABSTRACT

An apparatus includes a temporarily registered document creating unit configured to create a temporarily registered document in which a document to be registered is temporarily registered; a condition setting unit configured to set a condition used for updating the temporarily registered document to a finally registered document; a condition determining unit configured to determine whether the finally registered document meets the condition set for the temporarily registered document in response to a request for updating the temporarily registered document to the finally registered document; and an updating unit configured to update the temporarily registered document to the finally registered document in accordance with the request if the condition determining unit determines that the finally registered document meets the condition.

13 Claims, 12 Drawing Sheets

U.S. PATENT DOCUMENTS

| | | | |
|---|---|---|---|
| 2007/0216973 A1* | 9/2007 | Tagawa | 358/527 |
| 2007/0226193 A1* | 9/2007 | Todaka | 707/3 |
| 2007/0291284 A1* | 12/2007 | Kittaka et al. | 358/1.1 |
| 2008/0168024 A1* | 7/2008 | Petty | 707/1 |
| 2008/0177743 A1* | 7/2008 | Kasatani | 707/9 |
| 2008/0178120 A1* | 7/2008 | Yamamoto | 715/838 |
| 2009/0327961 A1* | 12/2009 | De Vorchik et al. | 715/825 |
| 2010/0067052 A1* | 3/2010 | Iwasaki | 358/1.15 |
| 2011/0041094 A1* | 2/2011 | Robert et al. | 715/810 |
| 2011/0122129 A1* | 5/2011 | Anthony et al. | 345/419 |

OTHER PUBLICATIONS

Kim et al., Document-based Workflow Modeling: a Case-based Reasoning Approach, Google 2002, pp. 77-93.*

Robertson et al., Data Mountain: Using Spatial Memory for Document Management, ACM 1998, pp. 153-162.*

Cockburn et al., 3D or not 3D? Evaluating the Effect of the Third Dimension in a Document Management System, ACM 2001, pp. 434-441.*

* cited by examiner

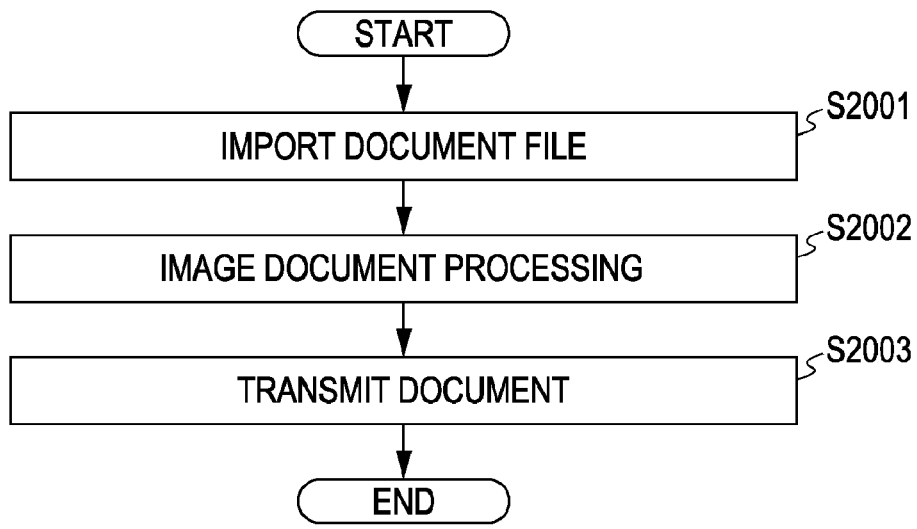
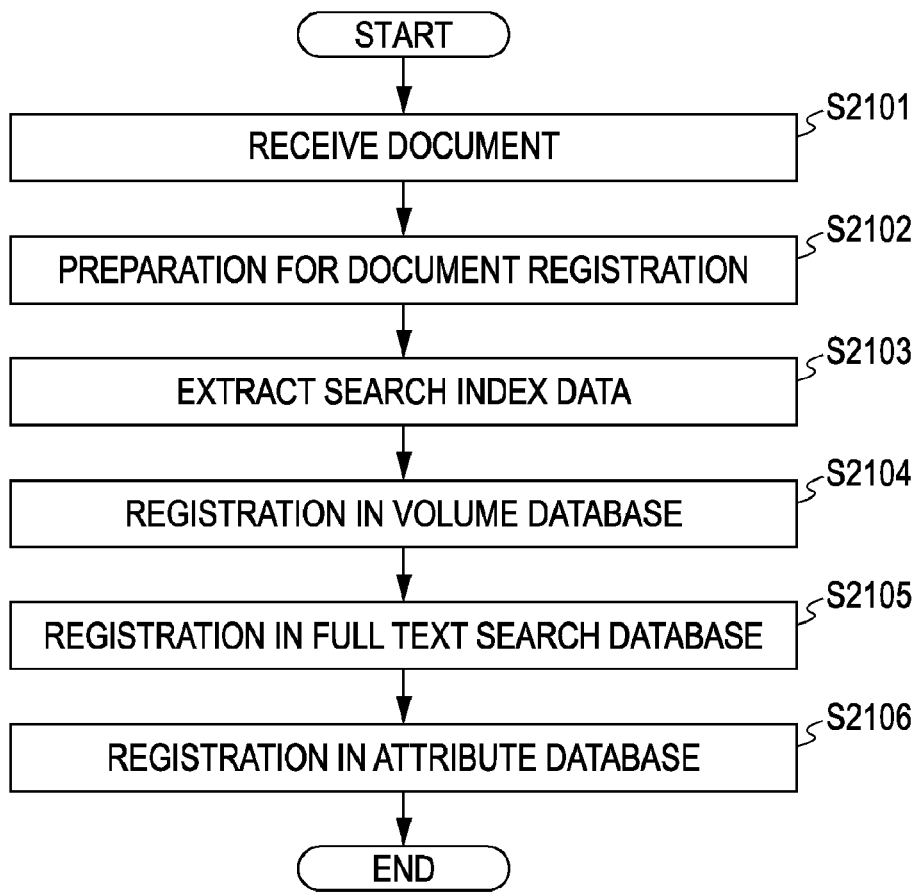

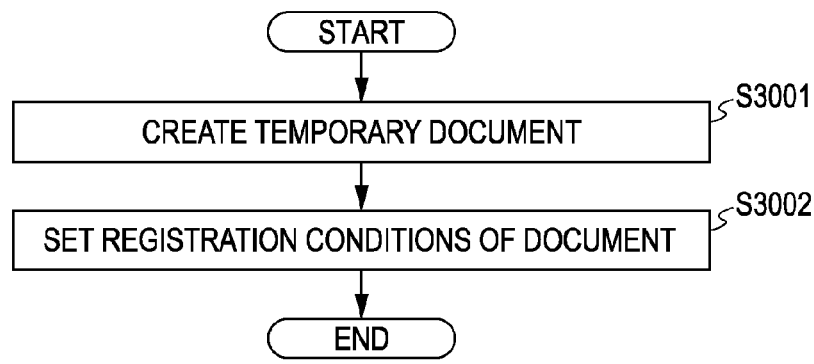
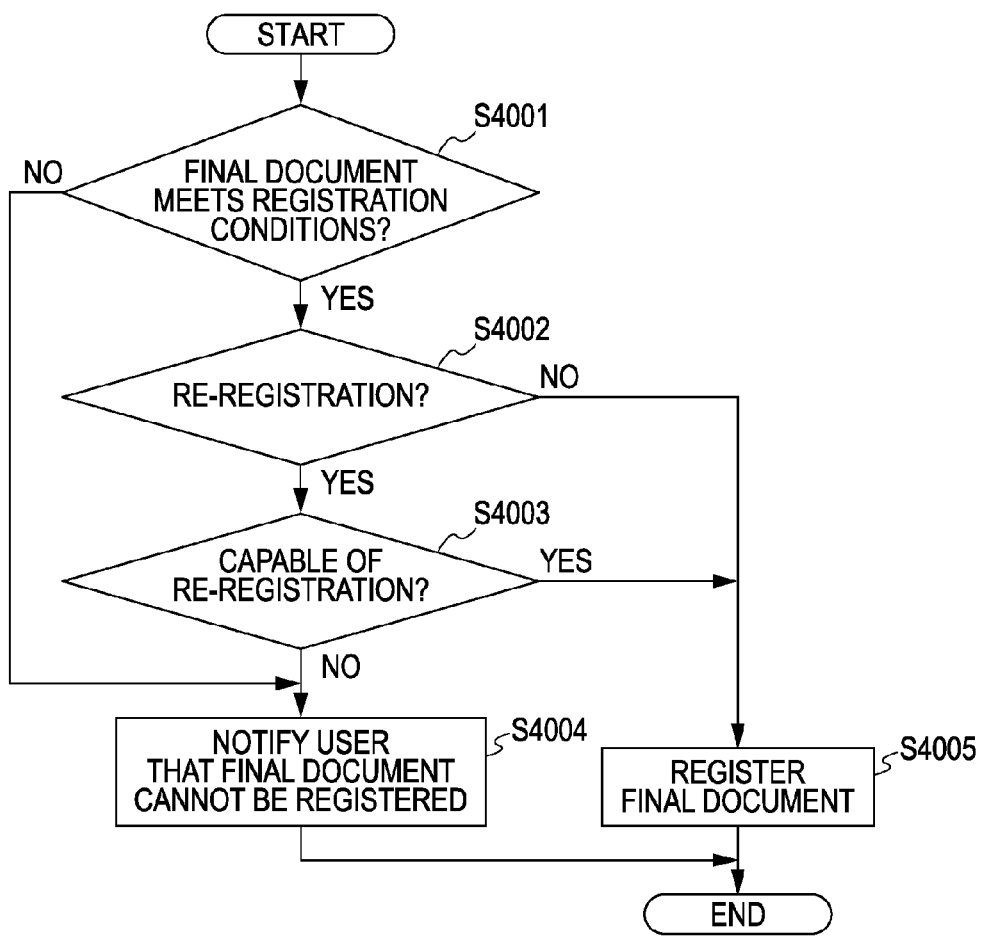

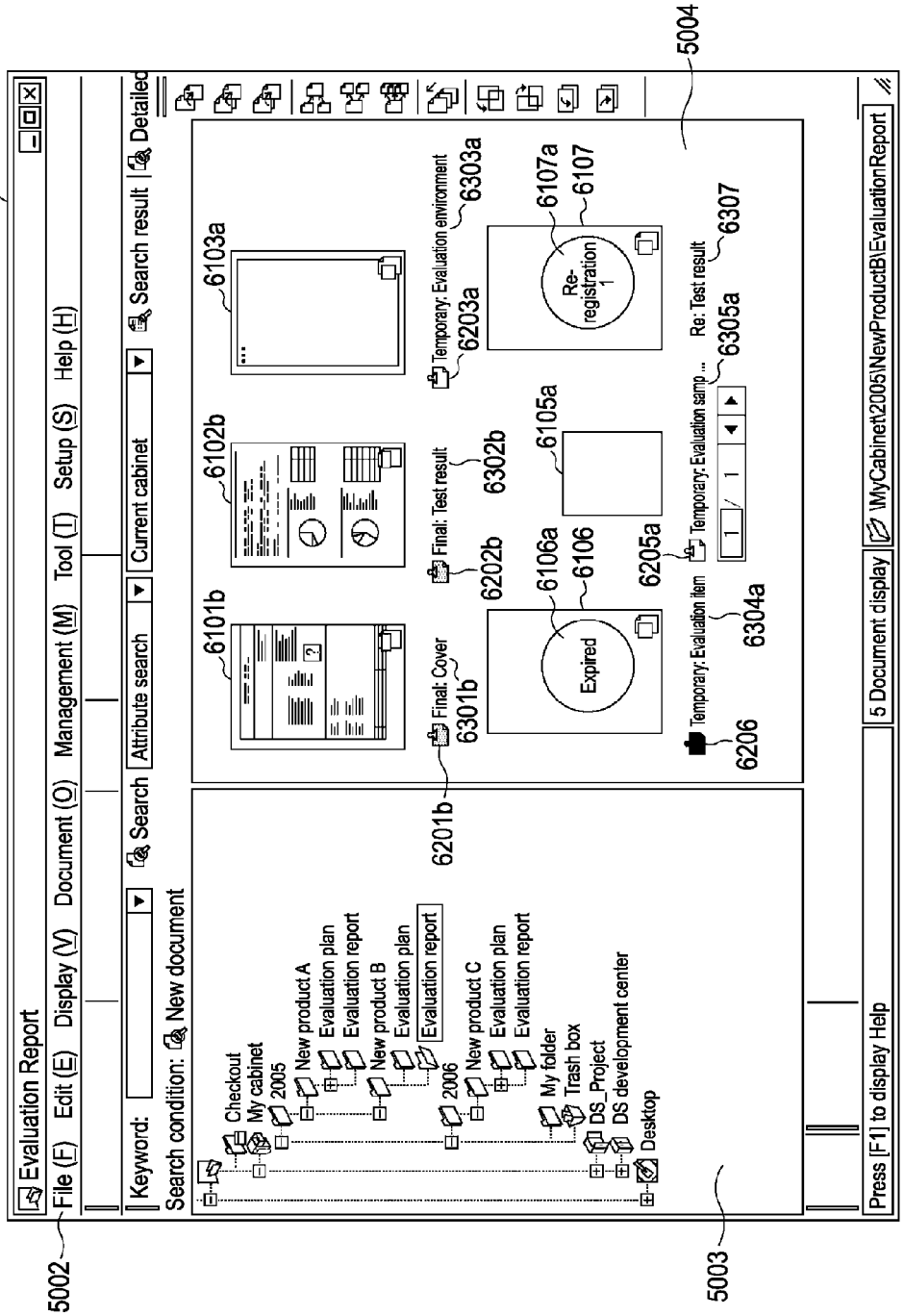

DATA PROCESSING APPARATUS, METHOD OF REGISTERING ELECTRONIC DOCUMENT, AND COMPUTER PROGRAM

BACKGROUND OF THE INVENTION

1. Field of the Invention

The present invention relates to data processing apparatuses, methods of registering electronic documents, and computer programs and, more particularly, to a data processing apparatus, a method of registering electronic documents, and a computer program that are suitable for registration of electronic documents.

2. Description of the Related Art

Registration of specified documents by specified methods in digital multifunction machines, such as multifunction printers (MFPs), or personal computer (PC) servers is demanded in routine business processes in offices and so on in recent years. In order to fulfill such a demand, workflow applications can be introduced to build specified business procedures as systems.

Systems that efficiently register documents in restricted processes without introducing the workflow applications are also proposed (for example, refer to Japanese Patent Laid-Open No. 2002-288196). In the technology disclosed in Japanese Patent Laid-Open No. 2002-288196, when attribute data about a document is received in registration of the document in an electronic storage, the attribute data is combined with standard document cover data that is set in advance to print the cover of the document including the attribute data. Then, the body of the document (paper document) created by a user is read by a scanner along with the printed cover of the document, and the scanned document is registered in the electronic storage. A process similar to temporary registration of the document is performed when the attribute data about the document is combined with the standard document cover data and the cover of the document is printed in the technology disclosed in Japanese Patent Laid-Open No. 2002-288196.

In the case of the introduction of the workflow system, it may be necessary to separately introduce the workflow application. In addition, a user may need to have technical knowledge to define the workflow in detail. Accordingly, for example, it may be necessary to request a consultation with the sales agent of the application which can increase the cost of performing the desired operation. Furthermore, it may not be easy to customize the workflow if the user wants to modify part of the workflow or to change the display of a screen after defining the workflow.

In the technology disclosed in Japanese Patent Laid-Open No. 2002-288196, it is necessary to print the temporarily-registered document (the cover of the document) on a sheet of paper. Accordingly, it is troublesome to finally register the temporarily-registered document. In addition, since the temporarily-registered document is only printed on a sheet of paper, it is not possible for the user to visually understand which document is finally set and how the document is stored in an electronic document management system, thus possibly causing failure or mistake in registration. Furthermore, since the user cannot easily distinguish the temporarily-registered document from the finally-registered document, it is not possible for the user to intuitively determine whether all the documents are prepared or the registration operation is not delayed when the multiple documents are to be registered.

SUMMARY OF THE INVENTION

According to an embodiment of the present invention, an apparatus includes a temporarily registered document creating unit configured to create a temporarily registered document in which a document to be registered is temporarily registered; a condition setting unit configured to set a condition used for updating the temporarily registered document to a finally registered document; a condition determining unit configured to determine whether the finally registered document meets the condition set for the temporarily registered document in response to a request for updating the temporarily registered document to the finally registered document; and an updating unit configured to update the temporarily registered document to the finally registered document in accordance with the request if the condition determining unit determines that the finally registered document meets the condition.

According to another embodiment of the present invention, a method of registering an electronic document includes creating a temporarily registered document in which a document to be registered is temporarily registered; setting a condition used for updating the temporarily registered document to a finally registered document; determining whether the finally registered document meets the condition set for the temporarily registered document in response to a request for updating the temporarily registered document to the finally registered document; and updating the temporarily registered document to the finally registered document in accordance with the request if it is determined that the finally registered document meets the condition.

According to another embodiment of the present invention, a program stored on a computer-readable medium includes instructions which, when executed by an apparatus, causes the apparatus to perform operations including creating a temporarily registered document in which a document to be registered is temporarily registered; setting a condition used for updating the temporarily registered document to a finally registered document; determining whether the finally registered document meets the condition set for the temporarily registered document in response to a request for updating the temporarily registered document to the finally registered document; and updating the temporarily registered document to the finally registered document in accordance with the request if it is determined that the finally registered document meets the condition.

According to an aspect of the present invention, when a user inputs an operation (e.g., a request) for updating the temporarily registered document to the finally registered document, it is determined whether the finally registered document meets the condition set for the temporarily registered document. If the finally registered document meets the condition, the temporarily registered document is updated to the finally registered document. Accordingly, the need for the user to determine whether the temporarily registered document can be updated to the finally registered document is eliminated. Consequently, it is possible to finally register the temporarily registered document more easily and reliably.

Further features of the present invention will become apparent from the following description of exemplary embodiments with reference to the attached drawings.

BRIEF DESCRIPTION OF THE DRAWINGS

FIG. 2 is a flowchart illustrating an example of a process in a client computer when document data is to be registered, according to an embodiment of the present invention.

FIG. 3 is a flowchart illustrating an example of a process in a document management server associated with registering of document data received from a client computer, according to an embodiment of the present invention.

FIG. 5 is a flowchart illustrating an example of a process in the electronic document management system when a temporarily registered document is to be created, according to an embodiment of the present invention.

FIG. 6 is a flowchart illustrating an example of a process in the electronic document management system when the creation of a finally registered document is completed and the temporarily registered document is updated with the finally registered document, according to an embodiment of the present invention.

FIG. 14 illustrates an example of a user interface window when replacement (re-registration) of a final document that has been registered is specified by a user, according to an embodiment of the present invention.

DESCRIPTION OF THE EMBODIMENTS

Embodiments of the present invention will herein be described with reference to the attached drawings.

Figure 1:
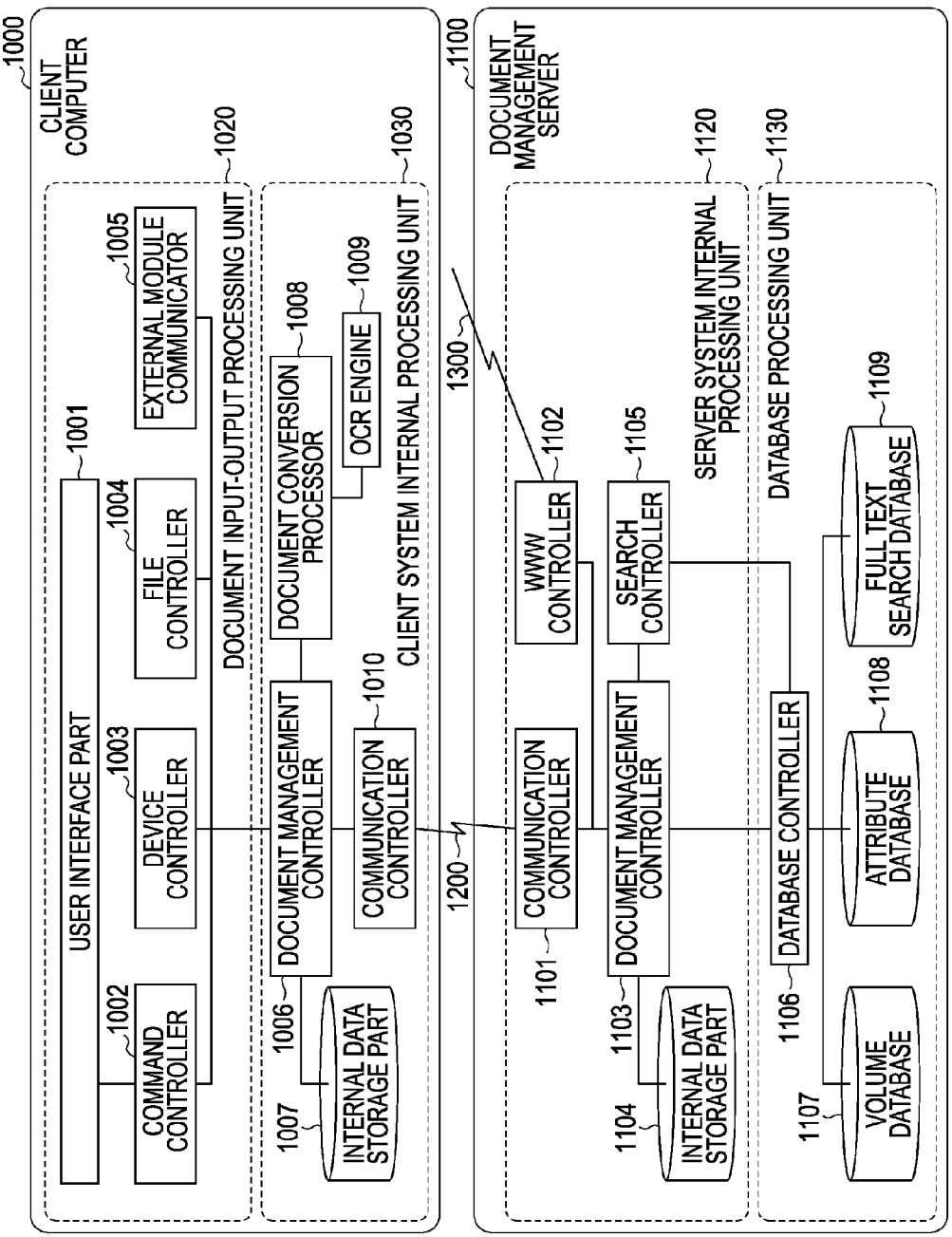
FIG. 1 is a block diagram illustrating an example of the system configuration of an electronic document management system according to an embodiment of the present invention.

FIG. 1 is a block diagram illustrating an example of the system configuration of an electronic document management system according to an embodiment of the present invention. The electronic document management system according to the present embodiment includes a client computer 1000 and a document management server 1100. The client computer 1000 and the document management server 1100 are, for example, personal computers and execute application programs running on the operating systems (OSs) to perform a variety of processing described below. The client computer 1000 reads and/or receives document data from a device, such as a scanner, or from a file on the OS and transmits the read document data to the document management server 1100. The document management server 1100 stores the document data transmitted from the client computer 1000 to allow multiple users to manage the document data. According to the present embodiment, all the stored document data is automatically converted into an Extensible Markup Language (XML) format and the document data in the XML format is processed. The client computer 1000 may access the document management server 1100 by using a Web browser to process the stored document data.

A document input-output processing unit 1020 in the client computer 1000 will now be described. The document input-output processing unit 1020 performs input and output of documents and operates the documents. The document input-output processing unit 1020 includes a user interface part 1001, a command controller 1002, a device controller 1003, a file controller 1004, and an external module communicator 1005.

The user interface part 1001 includes, for example, a keyboard, a mouse, and a liquid crystal display. By using the interface 1001, a user can register a document in the document management server 1100, acquire a document from the document management server 1100, or search for a document stored in the document management server 1100. The user can also use the user interface part 1001 to set the access right to a fixed keyword (the access right to the document management server 1100) or to acquire and display the document data after the access right is set. According to the present embodiment, the access right is set by the user who inputs a user ID and a password with the user interface part 1001, for example, when the user logs in the document management server 1100.

The command controller 1002 analyzes information indicating the content of an operation with the user interface part 1001 to perform processing corresponding to the result of the analysis. The command controller 1002 creates a command used to communicate with the document management server 1100, if needed.

The device controller 1003 controls a device, such as a scanner, connected to the client computer 1000 directly or over a network. Specifically, the device controller 1003, for example, reads document data from the device and receives data transmitted from the device.

The file controller 1004 receives document data stored in the OS of the client computer 1000 or the OS of an external apparatus, such as the document management server 1100. The file controller 1004 also imports and exports the document data stored in the document management server 1100 in and from the OS of the client computer 1000.

The external module communicator 1005 communicates with an external application program to pass document data in the document management server 1100 to the external application program or to receive document data from the external application program. For example, the external module communicator 1005 transmits a document stored in the document management server 1100 to a mailer conforming to Messaging Application Program Interface (MAPI).

A client system internal processing unit 1030 performing a variety of processing in the client computer 1000 will now be described. The client system internal processing unit 1030 includes a document management controller 1006, an internal data storage part 1007, a document conversion processor 1008, an optical character reader (OCR) engine 1009, and a communication controller 1010.

The document management controller 1006 is the core part of the client computer 1000 and performs processing in accordance with a file or command passed from the document input-output processing unit 1020.

The internal data storage part 1007 is a storage medium in which temporary data is stored. The internal data storage part 1007 temporarily stores data generated in image processing and data generated in communication with the document management server 1100.

As described above, the data (e.g., document data) is stored in the XML format in an embodiment. Accordingly, the document conversion processor 1008 converts document data that is not in the XML format into data in the XML format. When the document data is image data, the OCR engine 1009 performs OCR processing to the document data to extract text information in response to an instruction from the document conversion processor 1008, thereby converting the document data, which is the image data, into data in the XML format.

The communication controller 1010 controls communication with the document management server 1100 via a network 1200. The communication controller 1010 according to the present embodiment is specialized in the control of the communication with the document management server 1100. The communication protocol itself, such as Transmission Control Protocol/Internet Protocol (TCP/IP), is controlled by the controller in the OS.

A server system internal processing unit 1120 performing a variety of processing in the document management server 1100 will now be described. The server system internal processing unit 1120 includes a communication controller 1101, a World Wide Web (WWW) controller 1102, a document management controller 1103, an internal data storage part 1104, and a search controller 1105.

The communication controller 1101 controls communication with the communication controller 1010 in the client computer 1000. The communication controller 1101 is capable of concurrently communicating with the communication controllers in many client computers.

The WWW controller 1102 controls communication with an apparatus that uses a Web browser to access the document management server 1100 over a network 1300. The WWW controller 1102 basically performs processing similar to that of the communication controller 1101. However, the WWW controller 1102 uses Hyper Text Transfer Protocol (HTTP) as the communication protocol.

The document management controller 1103 controls the processing in the document management server 1100 in response to an instruction from the client computer 1000 or the Web browser.

The internal data storage part 1104 is a storage medium storing temporary data. The internal data storage part 1104 temporarily stores, for example, data generated in the communication with the client computer 1000 and a document converted according to a document conversion rule.

The search controller 1105 performs search processing requested by the client computer 1000. The search controller 1105 creates search index data for a document that is stored. The search controller 1105 also searches for a keyword in the stored document.

A database processing unit 1130 in the document management server 1100 will now be described. The database processing unit 1130 includes a database controller 1106, a volume database 1107, an attribute database 1108, and a full text search database 1109.

The database controller 1106 generates data to be stored in the volume database 1107, the attribute database 1108, or the full text search database 1109 and stores the corresponding documents in the volume database 1107, the attribute database 1108, or the full text search database 1109. The database controller 1106 extracts data from the volume database 1107, the document conversion processor 1008, or the full text search database 1109 in response to a request from the client computer 1000 to generate document data to be passed to the client computer 1000.

The volume database 1107 stores the entity of documents. The volume database 1107 may be provided in the file system of the OS.

The attribute database 1108 stores information concerning document attributes, such as the names of documents, the dates and times when the document are created, and comments. The attribute database 1108 also stores user management information including the identifier (ID) and password of a user who uses the electronic document management system, a table used for controlling access to keywords, the document conversion rule corresponding to the access right.

The full text search database 1109 stores the search index data resulting from extraction of text data from the stored document data. When the client computer 1000 instructs the document management server 1100 to perform full text search, the database controller 1106 performs the search in the full text search database 1109.

FIG. 2 is a flowchart illustrating an example of a process in the client computer 1000 when document data is to be registered.

Referring to FIG. 2, in Step S2001, the device controller 1003, the file controller 1004, or the external module communicator 1005 imports document data into a document management application program. Specifically, the device controller 1003 imports image data scanned by the scanner into the document management application program as the document data. The file controller 1004 imports document data existing in the OS into the document management application program. The external module communicator 1005 imports document data from an external application into the document management application program.

In Step S2002, the document conversion processor 1008 performs document conversion in response to an instruction from the document management controller 1006. Specifically, the document conversion processor 1008 generates a thumbnail image corresponding to the document data and converts the document data into data in the document storage format (XML format) in the electronic document management system, if needed. In this case, the document data may be temporarily stored in the internal data storage part 1007. As described above, in an embodiment, the stored documents are converted into the XML format. Accordingly, in an embodiment, when the document data concerns an image document, the document conversion processor 1008 uses the OCR engine 1009 to extract text data from the document data.

In Step S2003, the communication controller 1010 transmits the thumbnail image data and the document data generated by the document conversion processor 1008 to the document management server 1100. As described above, the TCP/IP is used as the communication protocol in the present embodiment. The basic processing relating to the TCP/IP is performed by the OS.

FIG. 3 is a flowchart illustrating an example of a process in the document management server 1100 associated with registering of document data received from a client computer.

Referring to FIG. 3, in Step S2101, the communication controller 1101 receives the data (for example, the thumbnail image and the document data) transmitted from the client computer 1000. Also in the document management server

1100, as in the client computer 1000, the basic processing relating to the TCP/IP is performed by the OS.

In Step S2102, the document management controller 1103 prepares for registration of the received data (for example, the thumbnail image and the document data). In Step S2103, the search controller 1105 extracts the search index data used for the search from the received document data. In Step S2104, the database controller 1106 registers the document data and the thumbnail image data received from the client computer 1000 in the volume database 1107.

In Step S2105, the database controller 1106 registers the search index data extracted from the document data in the full text search database 1109. In Step S2106, the database controller 1106 registers the following data in the attribute database 1108. The data to be registered in the attribute database 1108 includes the attribute data about the document, the IDs of the document data and the thumbnail image data registered in the volume database 1107, and the ID of the search index data registered in the full text search database 1109. The registration of the above data in the attribute database 1108 allows the data registered in the attribute database 1108, the volume database 1107, and the full text search database 1109 to be associated with each other.

Figure 4:
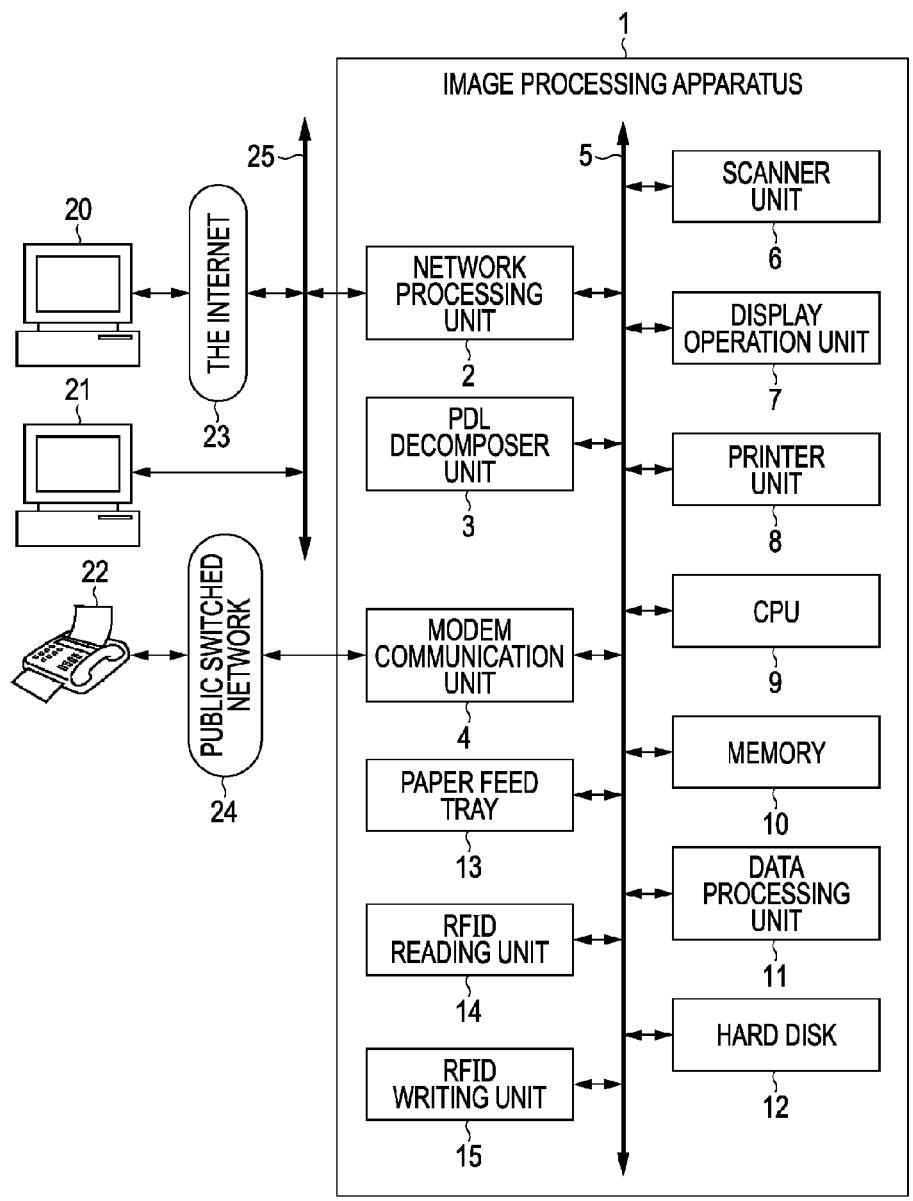
FIG. 4 is a block diagram illustrating an example of the configuration of an image processing apparatus connected to the electronic document management system, according to an embodiment of the present invention.

The electronic document management system illustrated in FIG. 1 is provided with a scanner and a printer and can be connected to an image processing apparatus connected to a network. The electronic document management system illustrated in FIG. 1 can receive document data from the image processing apparatus and can transmit document data to the image processing apparatus where the document data is printed or faxed. FIG. 4 is a block diagram illustrating an example of the configuration of an image processing apparatus connected to the electronic document management system according to the present embodiment.

Referring to FIG. 4, a network processing unit 2 in an image processing apparatus 1 controls data communication with a computer 21 connected to a network 25 and with a computer 20 connected over the Internet 23. The network processing unit 2 is connected to the communication controller 1101 in the electronic document management system to transmit and receive data to and from the communication controller 1101 therein. The computer 20 or the computer 21 in FIG. 4 corresponds to the document management server 1100 in the electronic document management system.

A page description language (PDL) decomposer unit 3 in the image processing apparatus 1 decomposes print data (PDL data) transmitted from the computer 20 or 21 into print image data and transfers the print image data to a printer unit 8 through an internal bus 5. The printer unit 8 prints the print image data transferred from the PDL decomposer unit 3. A predetermined storage area in a hard disk 12 in the image processing apparatus 1 may be used as a box and the print data transmitted from the computer 20 or 21 may be stored in the box as the print image data. The printer unit 8 may print the print image data stored in the box.

A modem communication unit 4 in the image processing apparatus 1 controls data communication with a facsimile (FAX) 22 connected to a public switched network 24. A scanner unit 6 in the image processing apparatus 1 scans a document that is set in the scanner unit 6 with the scanner. The image data scanned by the scanner unit 6 is transferred to a data processing unit 11 in the image processing apparatus 1 under the control of a central processing unit (CPU) 9. The data processing unit 11 performs image processing, such as rotation and variable magnification, to the transferred image data and stores the image data subjected to the image processing in a memory 10 in the image processing apparatus 1.

A display operation unit 7 in the image processing apparatus 1 is provided with a liquid crystal display including a touch panel. The state of an application program is displayed in the liquid crystal display and a user performs an input operation with the touch panel. The CPU 9, for example, executes an application program stored in the memory 10, performs arithmetic processing in each processing unit, and transfers data.

A paper feed tray 13 in the image processing apparatus 1 is provided with multiple paper feed cassettes in which sheets of printing paper are held and a tray in which sheets of paper to be used in printing is set. Sheets of different sizes and purposes are set in the multiple paper feed cassettes.

A radio frequency identification (RFID) reading unit 14 in the image processing apparatus 1 reads out information recorded in the RFID. An RFID writing unit 15 writes information in the RFID. The RFID writing unit 15 rewrites part of the information that has already been recorded in the RFID or adds information to the RFID.

FIG. 5 is a flowchart illustrating an example of a process in the electronic document management system when a temporarily registered document is to be created.

Referring to FIG. 5, in Step S3001, the client computer 1000 creates a temporarily registered document on the basis of a user's operation with the user interface part 1001. In this case, the client computer 1000 generates thumbnail image data about the temporarily registered document and transmits the document data about the created temporarily registered document and the thumbnail image data about the temporarily registered document to the document management server 1100. The document data about the created temporarily registered document and the thumbnail image data about the temporarily registered document are stored in the document management server 1100.

According to the present embodiment, a temporarily registered document creating unit is realized by, for example, performing Step S3001.

In Step S3002, the client computer 1000 sets, for example, registration conditions used for registering (updating) the created temporarily registered document as a finally registered document as attributes of the document data on the basis of a user's operation with the user interface part 1001. The registration conditions are set for every temporarily registered document that is created.

According to the present embodiment, a condition setting unit is realized by, for example, performing Step S3002.

FIG. 6 is a flowchart illustrating an example of a process in the electronic document management system when the creation of the finally registered document is completed and the temporarily registered document is updated with the finally registered document.

The temporarily registered document is hereinafter referred to as a temporary document, if required, and the finally registered document is hereinafter referred to as a final document, if required.

Referring to FIG. 6, in Step S4001, the client computer 1000 accepts the registration operation for the final document on the basis of a user's operation with the user interface part 1001 and determines whether the final document subjected to the registration operation meets the registration conditions set in Step S3002. According to the present embodiment, a condition determining unit is realized by, for example, performing Step S4001.

If the client computer 1000 determines that the final document subjected to the registration operation does not meet the registration conditions, the process goes to Step S4004. In Step S4004, the client computer 1000 notifies the user that the final document cannot be registered with the user interface part 1001. According to the present embodiment, a notifying unit is realized by, for example, performing Step S4004.

If the client computer 1000 determines in Step S4001 that the final document subjected to the registration operation meets the registration conditions, the process goes to Step S4002. If the final document is re-registered in a manner described below, the determination in Step S4001 is always affirmative and the process goes to Step S4002.

In Step S4002, the client computer 1000 determines whether the final document subjected to the registration operation is to be registered for the first time or whether the final document subjected to the registration operation has been registered and is to be re-registered (updated). If the client computer 1000 determines that the final document subjected to the registration operation is to be registered for the first time, the process goes to Step S4005. In Step S4005, the client computer 1000 overwrites the temporary document with the final document subjected to the registration operation and updates the temporary document to the final document to register the final document. In this case, the client computer 1000 performs necessary document attribute update processes including creation, update, and display of the thumbnail image data about the registered final document. The client computer 1000, then, transmits the document data about the registered final document and the thumbnail image data about the final document to the document management server 1100. The document data about the registered final document and the thumbnail image data about the final document are stored in the document management server 1100.

According to the present embodiment, an updating unit is realized by, for example, performing Step S4005.

If the client computer 1000 determines in Step S4002 that the final document subjected to the registration operation has been registered and is to be re-registered (updated), the process goes to Step S4003. In Step S4003, the client computer 1000 determines whether the final document subjected to the registration operation can be re-registered on the basis of predetermined conditions. The conditions used in the determination in Step S4004 will be described with reference to FIG. 14.

If the client computer 1000 determines that the final document subjected to the registration operation can be re-registered, the process goes to Step S4005. In Step S4005, the client computer 1000 overwrites the final document that has been registered with the final document subjected to the registration operation to re-register the final document. In this case, the client computer 1000 performs necessary document attribute update processes including creation, update, and display of the thumbnail image data about the re-registered final document. The client computer 1000, then, transmits the document data about the re-registered final document and the thumbnail image data about the final document to the document management server 1100. The document data about the re-registered final document and the thumbnail image data about the final document are stored in the document management server 1100.

If the client computer 1000 determines in Step S4003 that the final document subjected to the registration operation cannot be re-registered, the process goes to Step S4004. In Step S4004, the client computer 1000 notifies the user that the final document cannot be registered with the user interface part 1001. The flowchart illustrated in FIG. 6 is performed in units of documents. In other words, the process illustrated in the flowchart in FIG. 6 is repeated by the number of times the final document is registered.

The method of creating the temporary document in Step S3001 in FIG. 5 and the method of setting the registration conditions used for registering the temporary document as the final document in Step S3002 will now be described in detail.

Figure 7:
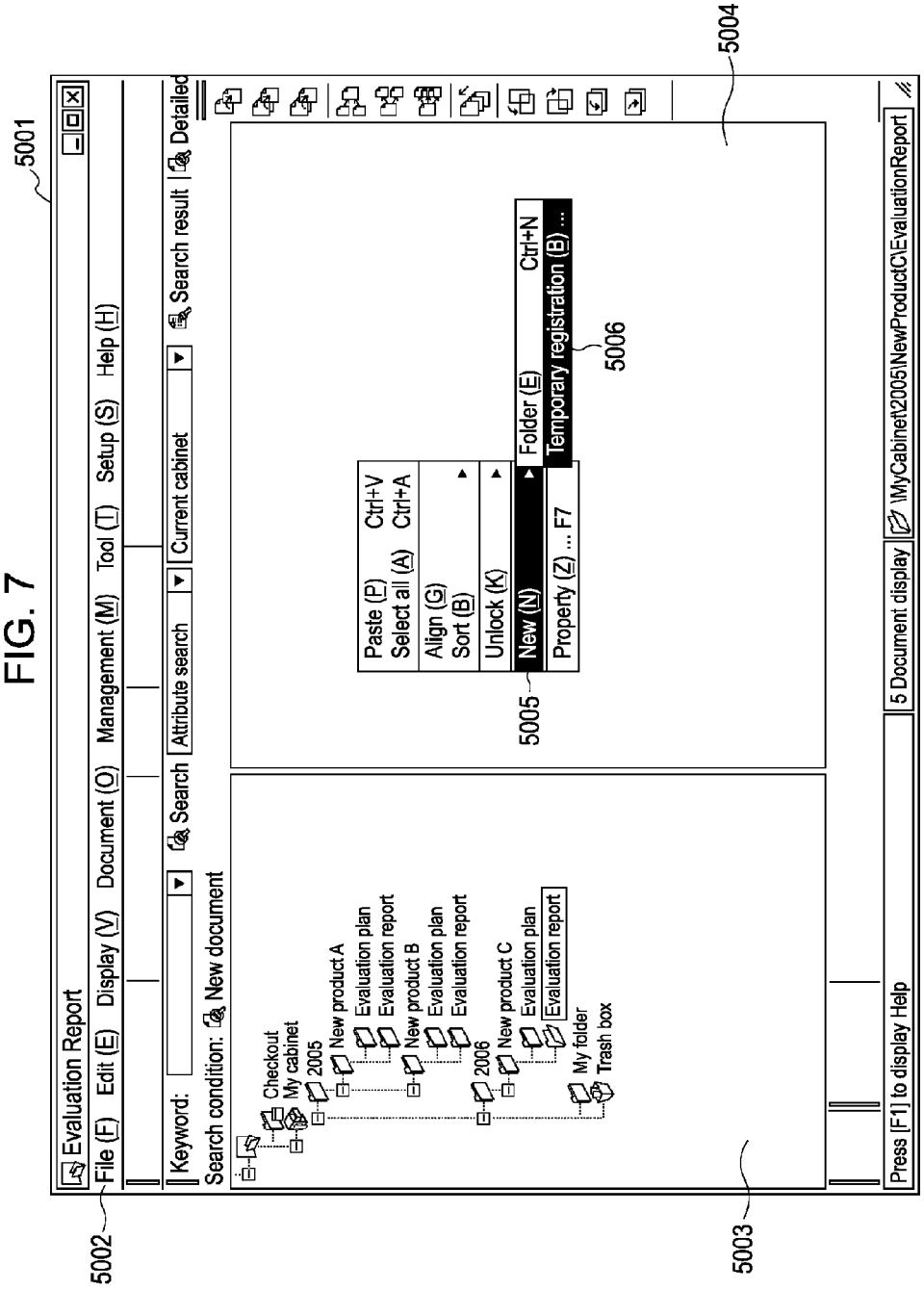
FIG. 7 illustrates an example of a user interface window displayed by the client computer when a document management application program is executed to create a temporary document, according to an embodiment of the present invention.

FIG. 7 illustrates an example of a user interface window displayed by the client computer 1000 when the document management application program is executed to create a temporary document. Information in the document management server 1100 is displayed in the user interface window in FIG. 7 by the client computer 1000. The user interface window in FIG. 7 is displayed in Step S3001 in FIG. 5.

Referring to FIG. 7, a user interface window 5001 is displayed by the client computer 1000 while the document management application program is being executed. A user uses the user interface window to communicate with the client computer 1000.

A menu bar 5002 is used by the user to select a desired process from among multiple hierarchical menus. The user can use the menu bar 5002 to instruct various operations including display and modification of the attributes of the folders and documents in the electronic document management system and registration, deletion, and movement of the document.

The structure of the folders in the electronic document management system is displayed in a tree view display area 5003 in a tree format. The folders sometimes intuitively indicate locations of documents and sometimes conceptually indicate locations where documents that have been searched for by filtering the values of specified attribute information are stored. The documents under a folder selected by the user from among the folders displayed in the tree view display area 5003 are displayed in a document display area 5004. If the folder specified by the user has subfolders, the documents under the subfolders are also displayed in the document display area 5004.

According to the present embodiment, a folder display unit is realized by, for example, displaying the tree view display area 5003 in Step S3001.

In order to temporarily register a document, the user specifies the temporary registration of the document from the menu bar 5002 or specifies temporary registration 5006 of the document from an operation menu 5005 displayed by right-clicking the mouse within the document display area 5004. The temporary registration of a document is performed by the administrator of the electronic document management system, the manager of the document to be created, or the person in charge of the operation. Accordingly, the person who temporarily registers a document can be the same as the person who has created the document or can be different from the person who has created the document.

The administrator of the electronic document management system grants a right to create a temporary document to the corresponding user, thereby preventing the temporary documents from unnecessarily overflowing to manage the document creation in a planned manner. In order to create the temporary document, the user logs in the document management server 1100. The document management server 1100 determines whether the user who logged in has the right to create the temporary document on the basis of the user ID and password input by the user at the login. Only if the user has the right to create the temporary document, the document management server 1100 permits the access by the client computer 1000 and permits the user to create the temporary document. After the creation of the temporary document is permitted, the client computer 1000 displays the user interface window 5001 in FIG. 7.

Figure 8:
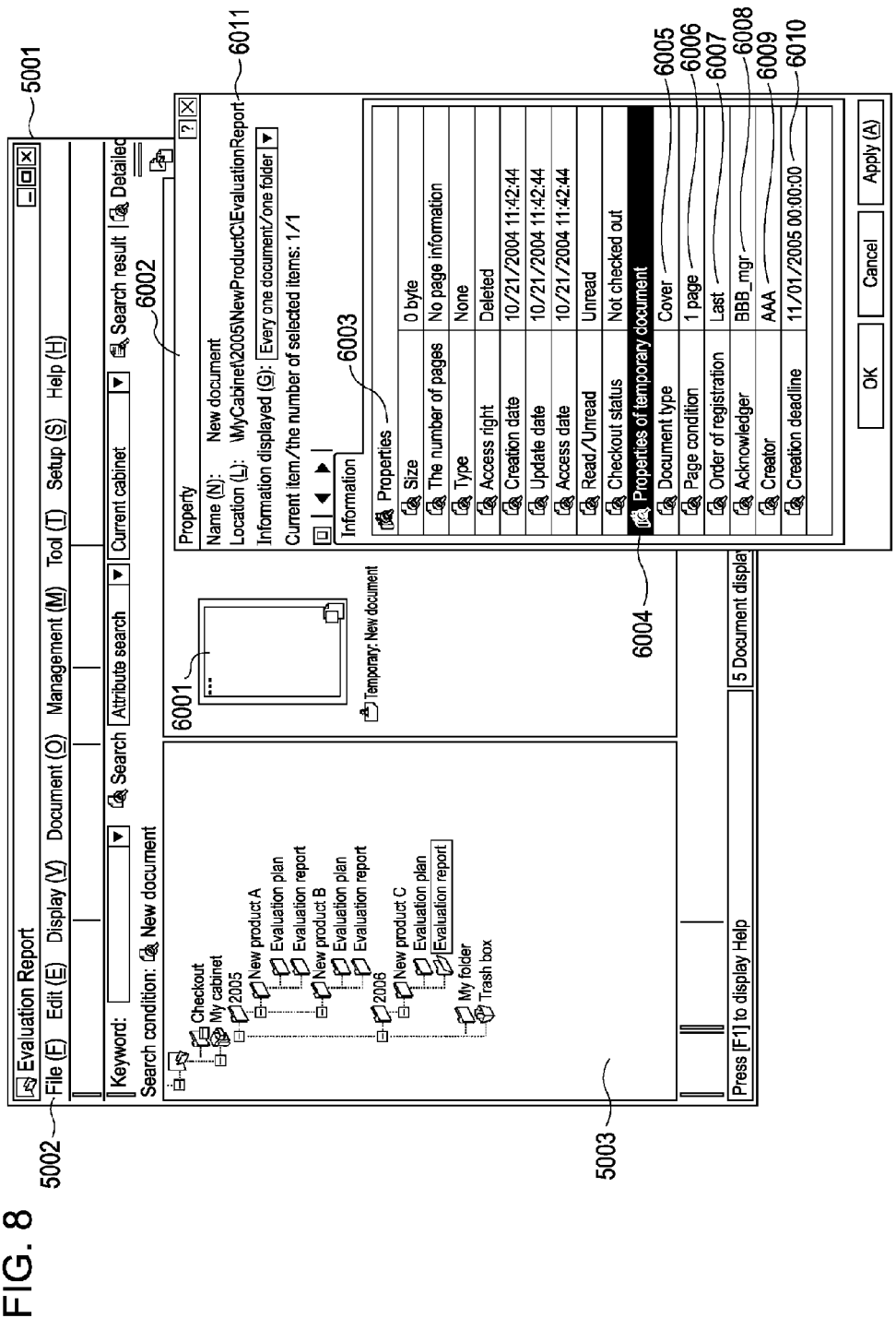
FIG. 8 illustrates an example of a user interface window displayed by the client computer when temporary registration of a document is specified in the user interface window in FIG. 7, according to an embodiment of the present invention.

FIG. 8 illustrates an example of a user interface window displayed by the client computer 1000 when the temporary registration 5006 of the document is specified in the user interface window 5001 in FIG. 7. The user interface window in FIG. 8 is displayed in Steps S3001 and S3002 in FIG. 5.

When the temporary registration 5006 of the document in FIG. 7 is specified, the client computer 1000 displays a temporary document thumbnail image 6001 and a document attribute setting window 6002 in the document display area 5004. The document attribute setting window 6002 is used to display and set attribute information about the created temporary document (the temporary document thumbnail image 6001). The folder path of the created temporary document (the temporary document thumbnail image 6001) is displayed in a folder path display area 6011.

Part of the attribute information about the created temporary document (the temporary document thumbnail image 6001) is displayed in a property list 6003. A list of basic information about the document is displayed in the property list 6003. A temporary document property list 6004 is used to display and set setting information specific to the temporary document. When the creation of the final document is completed and the temporary document is replaced with the final document, the registration conditions for accepting the registration of the final document are set in the temporary document property list 6004. Although it is determined whether all the registration conditions set in the temporary document property list 6004 are met in the present embodiment, it may be determined whether at least one of the registration conditions is met.

A document type 6005 in the temporary document property list 6004 is used to specify the type of the document to be registered. The user selects the type of the document from a drop-down list. The created temporary document (the temporary document thumbnail image 6001) cannot be updated for documents having types other than the document type 6005 that is selected. In other words, the created temporary document (the temporary document thumbnail image 6001) can be updated only for the final documents having the document attribute set in the document type 6005.

The document type (document name) 6005 is registered in advance in the electronic document management system (the document management server 1100). In addition, the documents corresponding to each document type are also registered in advance in the electronic document management system (the document management server 1100) as document templates. The documents corresponding to each document type are registered, for example, with a "cover" being set as the template attribute of the documents. If the document having the "cover" as the template attribute exists, it is necessary to edit the document having the "cover" as the template attribute to update the document. According to the present embodiment, if the "cover" is set as the document type 6005, the template of the cover format should be used.

A page condition 6006 is used to specify the number of pages of the final document to be registered. According to the present embodiment, the number of pages in a document or the upper limit of the number of pages in a document can be set as the page condition 6006 in order to avoid unnecessary load on the electronic document management system due to the registration of a document having a greater number of pages. Accordingly, the created temporary document (the temporary document thumbnail image 6001) cannot be updated for the document having the number of pages exceeding the number of pages set as the page condition 6006.

In addition to the number of pages, a page type (a file format, such as a portable document format (PDF) or a tagged image file format (TIFF)) or a page size may be specified as the page condition 6006. For example, the created temporary document (the temporary document thumbnail image 6001) cannot be updated for the template document having a page size other than the page size set as the page condition 6006.

An order of registration 6007 is used to set the order of registration when multiple temporary documents exist in the folder selected by the user from the folders displayed in the tree view display area 5003. For example, if it is necessary to add the digital signature of an acknowledger to the "cover" document, the order of registration 6007 is the "last" for the "cover" document because the "cover" document is acknowledged and registered after all the content of the document has been confirmed.

An acknowledger 6008 is used to set the user ID of a user permitted to acknowledge the document of the type specified in the document type 6005. The created temporary document (the temporary document thumbnail image 6001) cannot be updated for documents other than the final document to which the digital signature of the user corresponding to the user ID is added.

A creator 6009 is used to set the user ID of a user permitted to register the final document that is completed. Multiple user IDs may be set in the creator 6009. A creation deadline 6010 is used to set the registration deadline of the final document. For example, it is possible to set a date and time as the registration deadline of the final document. According to the present embodiment, it is possible for the user to instantly determine the document of which the registration deadline has passed by changing the method of displaying the temporary document thumbnail image 6001 or by varying the document icon displayed with the temporary document thumbnail image 6001.

An example of the registration of the final document in the flowchart in FIG. 6 will now be described in detail. The final document is registered in the client computer 1000 or in the image processing apparatus 1.

First, the registration of the final document in the client computer 1000 is described.

Figure 9:
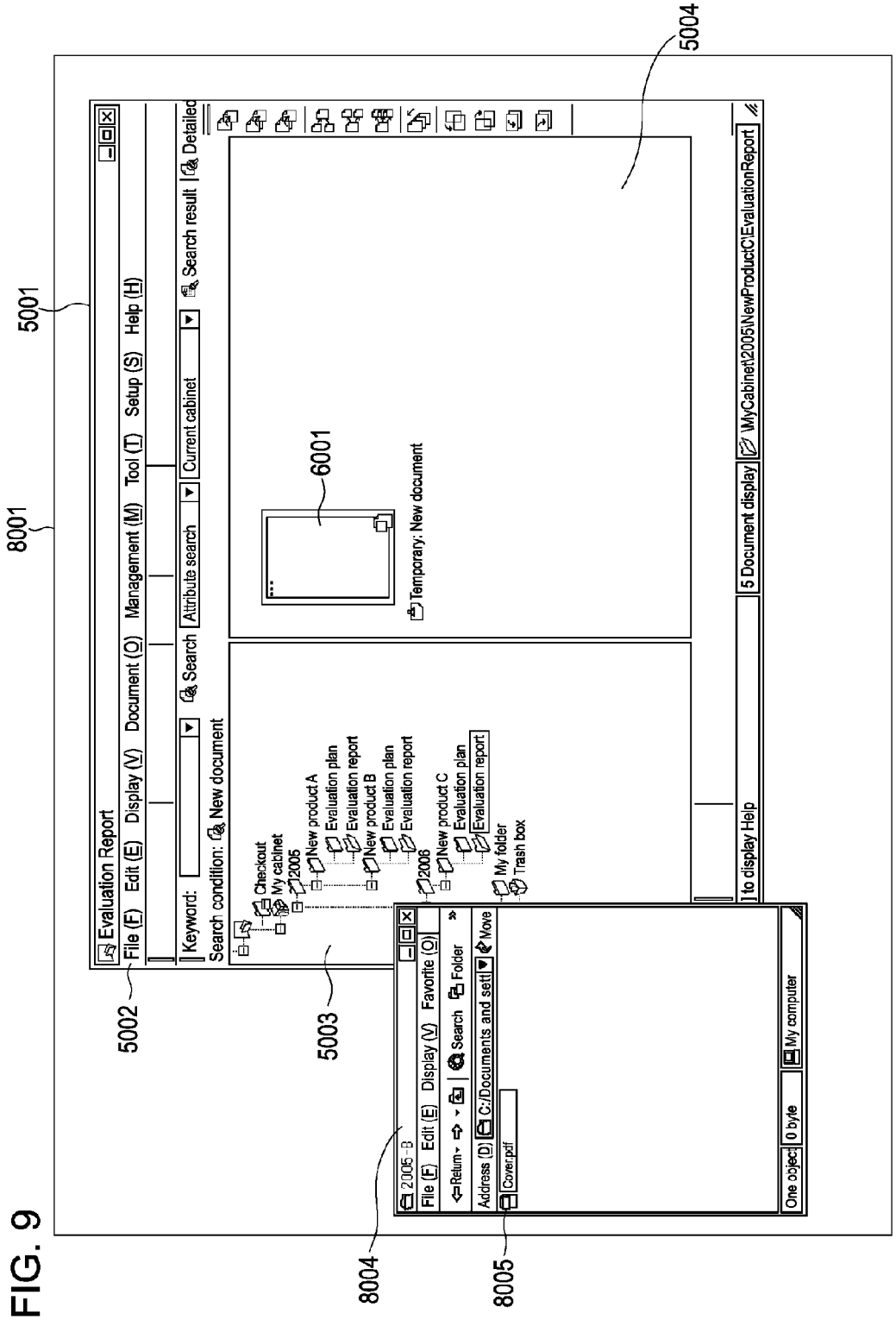
FIG. 9 illustrates an example of a user interface window displayed by the client computer when an application program for registering a final document is being executed, according to an embodiment of the present invention.

FIG. 9 illustrates an example of a user interface window displayed by the client computer 1000 when an application program for registering the final document is being executed. The user interface window in FIG. 9 is displayed before Step S4001 in FIG. 6.

The user interface window 5001 in FIG. 8 is displayed in a display screen 8001 (shown in FIG. 9) of the liquid crystal display. The temporary document thumbnail image 6001 is displayed in the document display area 5004 in the user interface window 5001. A final document 8005 (shown in FIG. 9) created by the user with the client computer 1000 is stored in an arbitrary folder 8004 (shown in FIG. 9) in the client computer 1000. In this state, the user can drag and drop the final document 8005 on the temporary document thumbnail image 6001 with the mouse to perform the registration operation of the final document. The determination in Step S4001 in FIG. 6 is performed in this registration operation.

Next, the registration of the final document in the image processing apparatus 1 is described.

Figure 10:
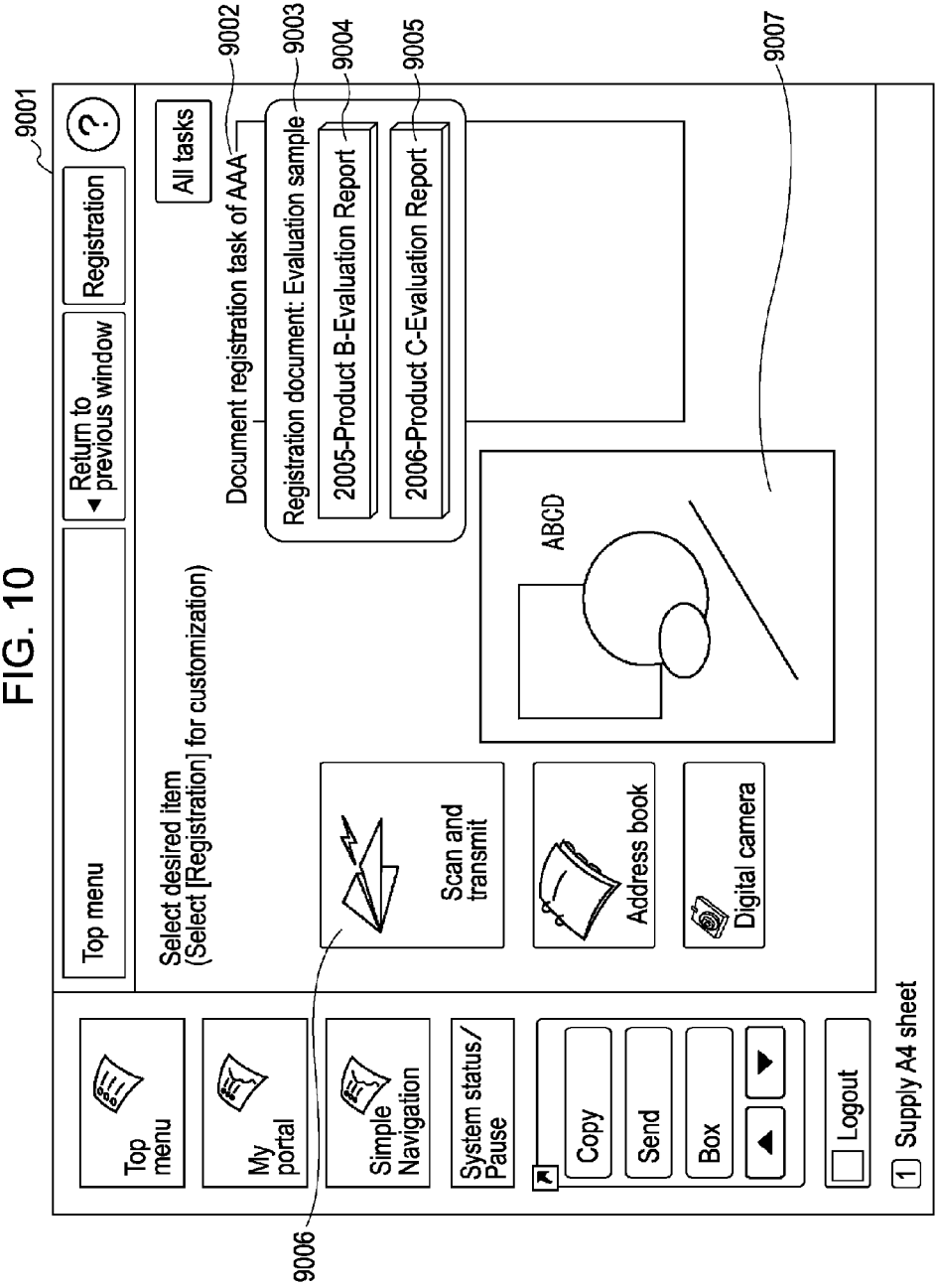
FIG. 10 illustrates an example of a user interface window displayed by the image processing apparatus when the application program for registering a final document is being executed, according to an embodiment of the present invention.

FIG. 10 illustrates an example of a user interface window displayed by the image processing apparatus 1 when an application program for registering the final document is being executed. This application program runs on the application platform.

Referring to FIG. 10, an operation screen 9001 is displayed in the display operation unit 7 in the image processing apparatus 1. When the image processing apparatus 1 is turned on, an input window used for inputting the user ID and password is displayed. Also in the image processing apparatus 1, like the client computer 1000, it is necessary for the user to receive the user authentication for logging in the document management server 1100 with the input window. When the user authentication is accepted, the operation screen 9001 is displayed.

The operation screen 9001 is a touch screen. The image processing apparatus 1 can detect that the user touches the operation screen 9001 to receive the input of the user. A document registration task assigned to the user who logged in (a user AAA in the example in FIG. 10) is automatically displayed in a task display area 9002 for each user. A document which the login user intends to register is displayed in a registration document display area 9003 for the user.

In the example illustrated in FIG. 10, an operation for registering a document "Evaluation sample" is assigned to the user AAA. The "Evaluation sample" is one document type and can be selected as the document type 6005 described above. In other words, the example in FIG. 10 is displayed by setting the "Evaluation sample" in the document type 6005 and setting the "AAA" in the creator 6009 in the registration of the temporary document.

Folder paths 9004 and 9005 of the electronic document management system in which the final documents are to be registered are displayed in the registration document display area 9003 for the user. The folder path 9004 or 9005 coincides with the folder path displayed in the folder path display area 6011. In the example illustrated in FIG. 10, the user AAA needs to create and register two final documents of the document type "Evaluation sample" and needs to register the final documents in the corresponding two folders.

Then, the user sets the created paper document to be registered as the final document in the scanner unit 6 and presses a "Scan and transmit" button 9006. The scanner in the scanner unit 6 scans the paper document. A reduced image (thumbnail image) of the scanned paper document is displayed in a preview area 9007. Before the paper document is scanned, no image is displayed in the preview area 9007. The user confirms the reduced image of the paper document, displayed in the preview area 9007. Then, the user presses the folder path 9004 or 9005 indicating the destination to which the document data about the paper document is to be registered to select the folder path 9004 or 9005 in order to register the document data about the paper document in the document management server 1100. When the folder path 9004 or 9005 is pressed, the document data about the scanned paper document and the thumbnail image data about the paper document are registered in the document management server 1100. Concurrently, the folder path 9004 or 9005, which is the destination, is deleted from the registration document display area 9003.

Figure 11:
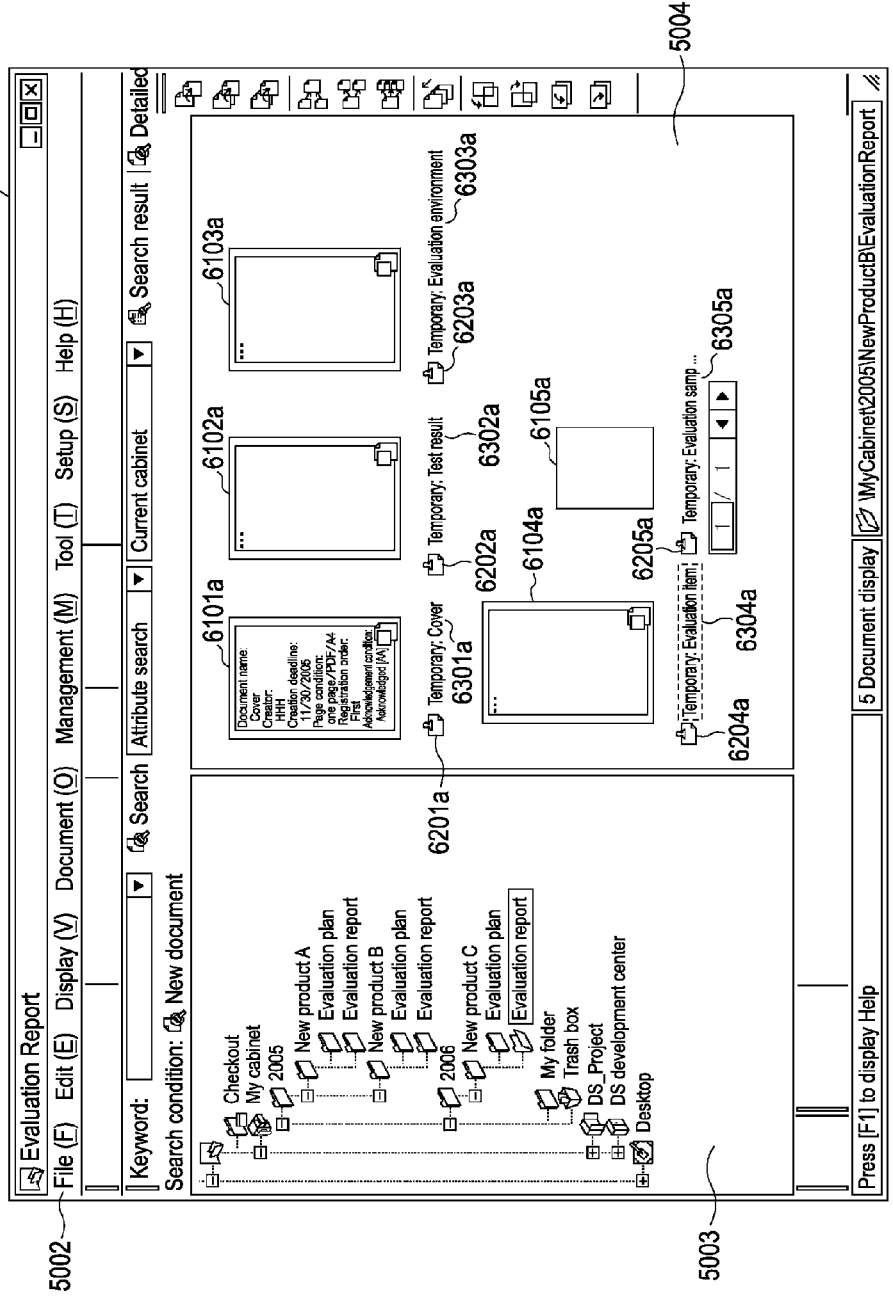
FIG. 11 illustrates an example of a user interface window in a state in which five temporary documents are registered in advance, according to an embodiment of the present invention.

FIG. 11 illustrates an example of a user interface window in a state in which five temporary documents are registered in advance. The user interface window in FIG. 11 is displayed in the client computer 1000 after Step S3002 in FIG. 5.

Referring to FIG. 11, a temporary document thumbnail image 6101a is a thumbnail image of a temporary document of a document type "Cover". A temporary document thumbnail image 6102a is a thumbnail image of a temporary document of a document type "Test result". A temporary document thumbnail image 6103a is a thumbnail image of a temporary document of a document type "Evaluation environment". A temporary document thumbnail image 6104a is a thumbnail image of a temporary document of a document type "Evaluation item". A temporary document thumbnail image 6105a is a thumbnail image of a temporary document of a document type "Evaluation sample".

In the example illustrated in FIG. 11, no final document is registered for the temporary documents (the temporary document thumbnail images 6101a to 6105a). Accordingly, the user can select display in blank as in the temporary document thumbnail images 6102a to 6105a or display of the attribute information (registration conditions) set in the temporary document property list 6004 as a thumbnail image as in the temporary document thumbnail image 6101a. This selection is performed by using the menu bar 5002.

According to the present embodiment, a temporarily registered thumbnail image display unit is realized by, for example, displaying the temporary document thumbnail images 6102a to 6105a in Step S3002.

Document icons 6201a to 6205a are displayed under the temporary document thumbnail images 6101a to 6105a. The document icons 6201a to 6205a are displayed in blue to allow the user to instantly determine that the displayed documents are temporary documents in the present embodiment. Document names 6301a to 6305a are displayed at the right side of the document icons 6201a to 6205a. Displaying "Temporary" at the beginning of the document names 6301a to 6305a also allows the user to instantly determine that the displayed documents are temporary documents in the present embodiment.

According to the present embodiment, a first identification image is realized by, for example, the document icons 6201a to 6205a and the document names 6301a to 6305a. A first identification image displaying unit is realized by, for example, displaying the document icons 6201a to 6205a and the document names 6301a to 6305a in Step S3002 in FIG. 5.

Figure 12:
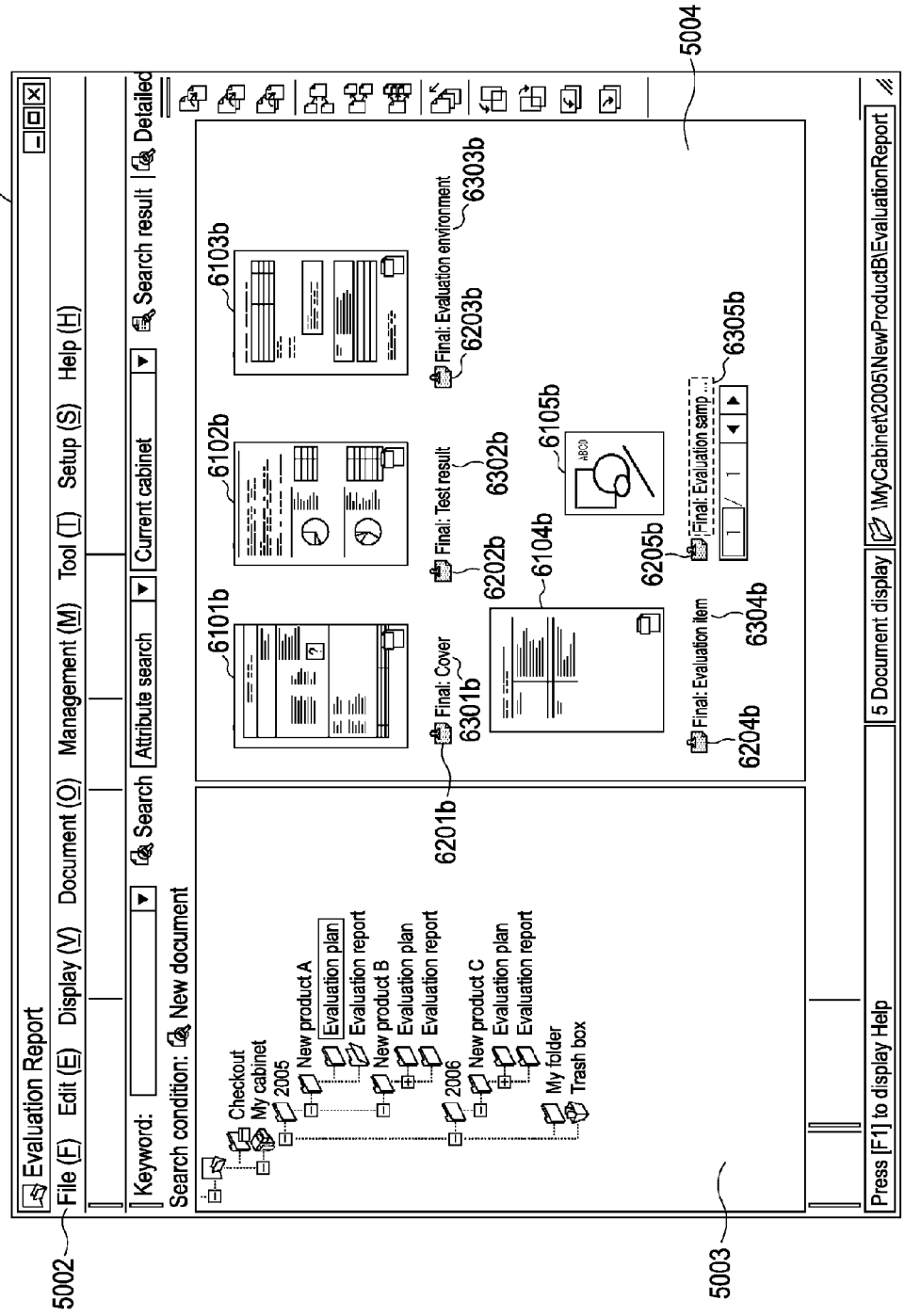
FIG. 12 illustrates an example of a user interface window in a state in which the five temporary documents in FIG. 11 are replaced with the final documents and the final documents are registered, according to an embodiment of the present invention.

FIG. 12 illustrates an example of a user interface window in a state in which the five temporary documents in FIG. 11 are replaced with the final documents and the final documents are registered. The user interface window in FIG. 12 is displayed in the client computer 1000 in Step S4005 in FIG. 6. As described above, the process illustrated in the flowchart in FIG. 6 is repeated by the number of times the final document is registered. Accordingly, the user interface window in FIG. 12 is displayed as a result of repeating Step S4005 five times.

Referring to FIG. 12, a final document thumbnail image 6101b is a thumbnail image of a final document of the document type "Cover". A final document thumbnail image 6102b is a thumbnail image of a final document of the document type "Test result". A final document thumbnail image 6103b is a thumbnail image of a final document of the document type "Evaluation environment". A final document thumbnail image 6104b is a thumbnail image of a final document of the document type "Evaluation item". A final document thumbnail image 6105b is a thumbnail image of a final document of the document type "Evaluation sample".

According to the present embodiment, a finally registered thumbnail image display unit is realized by, for example, displaying the final document thumbnail images 6101b to 6105b in Step S4005 in FIG. 6.

Document icons 6201b to 6205b are displayed under the final document thumbnail images 6101b to 6105b. The document icons 6201b to 6205b are displayed in gray, instead of the document icons 6201a to 6205a in blue, to allow the user to instantly determine that the displayed documents are final documents in the present embodiment. Document names 6301b to 6305b are displayed at the right side of the document icons 6201b to 6205b. Displaying "Final" at the beginning of the document names 6301b to 6305b also allows the user to instantly determine that the displayed documents are final documents in the present embodiment.

According to the present embodiment, a second identification image is realized by, for example, the document icons 6201b to 6205b and the document names 6301b to 6305b. A second identification image displaying unit is realized by, for example, displaying the document icons 6201b to 6205b and the document names 6301b to 6305b in Step S4005 in FIG. 6.

Figure 13:
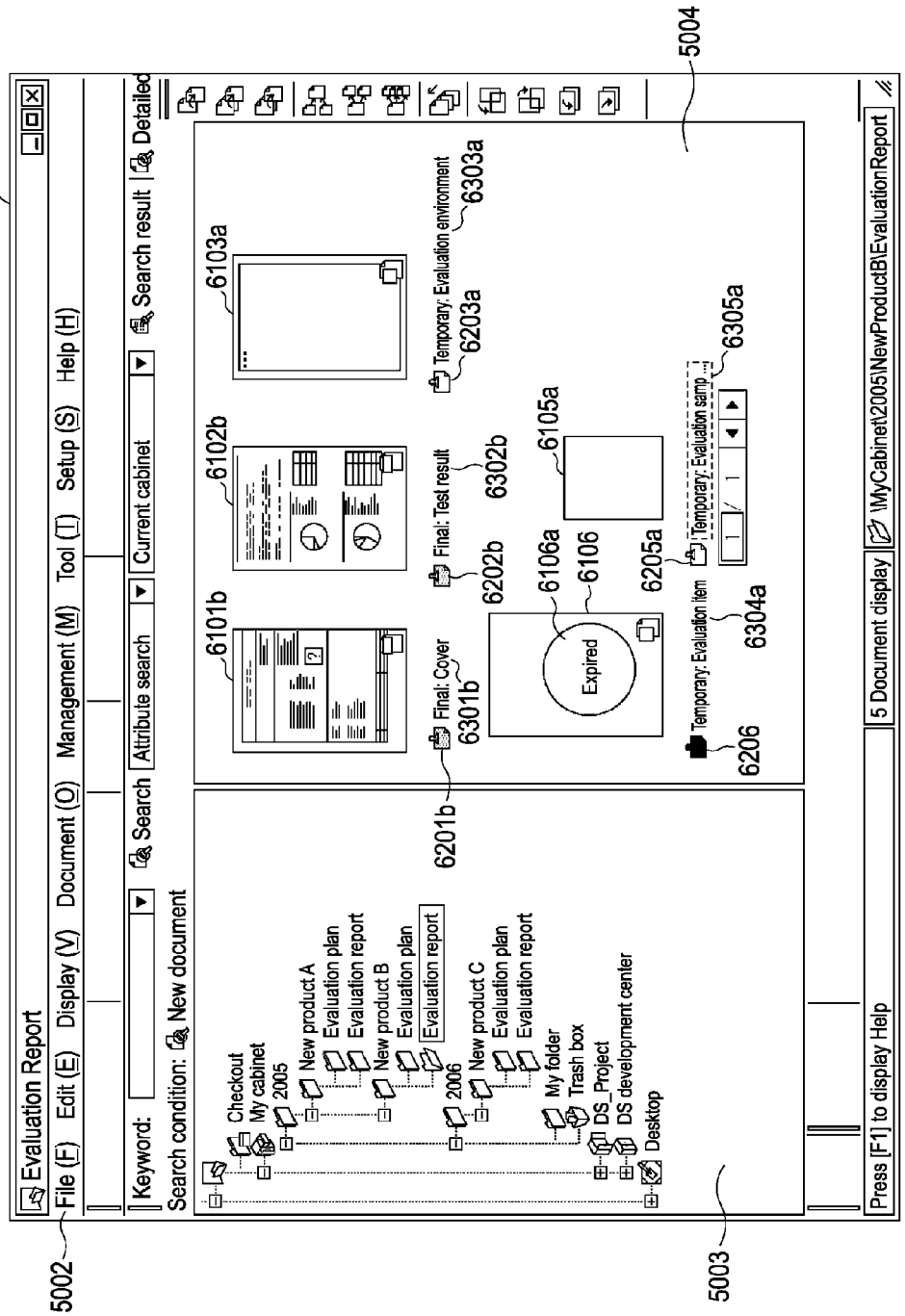
FIG. 13 illustrates an example of a user interface window including a document of which the registration deadline set in a temporary document property list has passed, according to an embodiment of the present invention.

FIG. 13 illustrates an example of a user interface window including a document of which the registration deadline set in the temporary document property list 6004 has passed. The user interface window in FIG. 13 is displayed in Step S4005 in FIG. 6.

The user interface window in FIG. 13 is in the middle of the setting operation and includes both the temporary documents and the final documents. The temporary document property list 6004 is set for every temporary document, and the registration deadline of a temporary document thumbnail image 6106 set in the creation deadline 6010 has passed. Not the thumbnail image of the temporary document of the document type "Evaluation item" but an image 6106a indicating that the deadline has passed is displayed as the temporary document thumbnail image 6106. The image 6106a indicating that the deadline has passed is registered in the document management server 1100 in advance. In addition, according to the present embodiment, a document icon 6206 under the temporary document thumbnail image 6106 is displayed in red for warning to allow the user to instantly determine that any problem is caused.

If a final document that does not meet the registration conditions set in the temporary document property list 6004 is to be registered, the registration operation of the final document that does not meet the registration conditions may be indicated to the system administrator or the user who has created the temporary document by an e-mail, in addition to the display of the warning as in the example in FIG. 13. The registration operation of the final document that does not meet the registration conditions may be recorded in a log.

FIG. 14 illustrates an example of a user interface window when replacement (re-registration) of a final document that has been registered is specified by the user. The user interface window in FIG. 14 is displayed during Step S4002, S4003, or S4005 in FIG. 6.

As apparent from the final document thumbnail image 6102b, the blue document icon 6202b, and the document name 6302b having "Final" added thereto in FIG. 14, the final document has already been registered for the document of the document type "Test result".

The user might want to replace the final document that has already been registered with another final document. However, if the update of the final document is freely permitted, users other than the user who updated the final document cannot determine when the final document was updated. Consequently, users other than the user who updated the final document can continue to use the old final document. According to the present embodiment, if the final document is re-registered, a temporarily replaced document for the final document which is already registered is created, instead of overwriting the final document. A temporarily replaced document thumbnail image 6107, which is a thumbnail image of the temporarily replaced document, is displayed in addition to the final document thumbnail image 6102b.

According to the present embodiment, a temporarily replaced document creating unit is realized by, for example, creating a temporarily replaced document in Step S4005 in FIG. 6.

An image 6107a indicating that the document is re-registered is displayed in the temporarily replaced document thumbnail image 6107 to allow the user to instantly determine that the displayed document is a temporarily replaced document. Displaying "Re:" at the beginning of a document name 6307 under the temporarily replaced document thumbnail image 6107 allows the user to instantly determine that the displayed document is a temporarily replaced document.

The temporarily replaced document is not left as a completed document. Accordingly, no document icon is displayed under the temporarily replaced document thumbnail image 6107. After the temporarily replaced document is created, the creation of the temporarily replaced document is indicated to the administrator of the electronic document management system or the user who has registered the final document by an e-mail. The creation of the temporarily replaced document is also recorded in the log. The administrator of the electronic document management system or the user who has registered the final document opens the temporarily replaced document to confirm the content thereof and inquires of the creator of the temporarily replaced document about the content of the update, if necessary, to determine whether the replacement of the final document to be replaced is permitted. If the final document is to be replaced, the administrator of the electronic document management system or the user who has registered the final document drags and drops the temporarily replaced document thumbnail image 6107 on the final document thumbnail image 6102b with the mouse. The client computer 1000 recognizes the operation of the administrator of the electronic document management system or the user who has registered the final document by the user authentication performed at the login to the document management server 1100.

The client computer 1000 determines whether the document type of the final document corresponding to the temporarily replaced document thumbnail image 6107 coincides with the document type of the final document corresponding to the final document thumbnail image 6102b. In addition, the client computer 1000 determines whether the user who drags and drops the temporarily replaced document thumbnail image 6107 on the final document thumbnail image 6102b is the administrator of the electronic document management system or the user who has registered the final document. If the above two conditions are met, the client computer 1000 replaces the final document corresponding to the final document thumbnail image 6102b with the final document corresponding to the temporarily replaced document and automatically deletes the temporarily replaced document. The client computer 1000 records the replacement of the final document in the log.

According to the present embodiment, a replacement determination unit is realized by, for example, determining whether the above two conditions are met in Step S4003 in FIG. 6. A replacing unit is realized by, for example, replacing the final document corresponding to the final document thumbnail image 6102b with the final document corresponding to the temporarily replaced document in Step S4005 in FIG. 6. Although it is preferred to adopt the above two determination conditions, only at least one of the two determination conditions may be adopted.

As described above, according to the present embodiment, the temporary document is created and the registration conditions used for registering the temporary document as the final document are set for the created temporary document. The thumbnail image of the temporary document (the temporary document thumbnail image) in the folder selected by the user from among the folders displayed in the tree view display area 5003 is displayed in the document display area 5004. After the user drags and drops the final document 8005 separately created on the temporary document thumbnail image to perform the registration operation for registering the temporary document as the final document, it is determined whether the final document 8005 subjected the registration operation meets the registration conditions. If the final document 8005 subjected the registration operation meets the registration conditions, the temporary document is registered as the final document. If the final document 8005 subjected the registration operation does not meet the registration conditions, the fact that the registration conditions are not met is indicated to the user.

Accordingly, it is possible to reliably prevent failure or mistake in registration without imposing higher load on the user, thereby finally registering the temporarily registered document easily and reliably. For example, it is possible to set the procedure for the document registration without introducing a special workflow application. In addition, since special technical knowledge is not required, anybody can use the electronic document management system at a lower cost. Since the electronic document management system can be easily customized, it is possible to perform a desired operation of the electronic document management system in a short period. Furthermore, it is possible for the user to visually understand how the document is set and stored, thus reliably preventing any failure or mistake in registration of the final document.

According to the present embodiment, the color of the document icons 6201*a* to 6205*a* under the temporary document thumbnail images 6101*a* to 6105*a* is made different from that of the document icons 6201*b* to 6205*b* under the final document thumbnail images 6101*b* to 6105*b*. The word added to the beginning of the document names 6301*a* to 6305*a* under the temporary document thumbnail images 6101*a* to 6105*a* is also made different from the word added to the beginning of the document names 6301*b* to 6305*b* under the final document thumbnail images 6101*b* to 6105*b*. Accordingly, the user can easily determine whether the registration of the final documents is completed even if the multiple final documents are to be registered. As a result, it is possible for the user to intuitively determine whether all the final documents are registered or the registration operation is not delayed, thereby improving the working efficiency.

According the present embodiment, the image 6107*a* indicating the re-registration is displayed in the temporarily replaced document thumbnail image 6107 and "Re:" is displayed at the beginning of the document name 6307 under the temporarily replaced document thumbnail image 6107. Accordingly, the user can intuitively determine that the displayed document is a temporarily replaced document.

When a temporarily replaced document is created, the creation of the temporarily replaced document is indicated to, for example, the system administrator. If the acknowledgement by the system administrator is received, the temporarily replaced document is replaced with the final document that has been registered. Otherwise, the fact that the temporarily replaced document cannot be replaced is indicated to the user. Accordingly, users other than the user who updated the final document can know when the final document is updated.

Since the image 6106*a* indicating that the registration deadline has passed is displayed in the temporary document thumbnail image 6106 of which the registration deadline set in the creation deadline 6010 has passed, the user can easily know that the registration deadline has passed.

The processes performed by the client computer 1000, which embodies a data processing apparatus, may be performed by the image processing apparatus 1. In this case, the image processing apparatus 1 can realize the processes performed by the client computer 1000 by using an application program running on the application platform.

Other Exemplary Embodiments

The units in the electronic document management system according to the embodiments of the present invention described above and the steps in the method of registering electronic documents are realized by executing programs stored in the random access memory (RAM) or read only memory (ROM) in the computer. The present invention is embodied by programs and the computer-readable recording medium having the programs recorded therein.

The present invention can be embodied as, for example, a system, an apparatus, a method, a program, or a storage medium. Specifically, the present invention is applicable to a system including multiple apparatuses or to an apparatus including only one device.

The present invention can be embodied by directly or remotely supplying software programs (the programs corresponding to the flowcharts in FIGS. 2, 3, 5, and 6) realizing the functions according to the above embodiments to a system or an apparatus, the computer in which system or apparatus reads out and executes the supplied program code.

Accordingly, the present invention is embodied by the program code itself installed in the computer to realize the functions according to the embodiments of the present invention. The present invention is applicable to the computer program realizing the functions according to the embodiments of the present invention.

In this case, the program code may be object codes, programs executed by an interpreter, or script data supplied to the OS as long as the program code has the function of the programs.

The recording medium supplying the programs may be, for example, a Floppy Disc®, a hard disk, an optical disk, a magneto-optical disk (MO), a compact disc-read only memory (CD-ROM), a compact disc recordable (CD-R), a compact disc rewritable (CD-RW), a magnetic tape, a nonvolatile memory card, a ROM, or a digital versatile disc (DVD) such as a DVD-ROM or a DVD-R.

The computer programs according to the embodiments of the present invention or files that are compressed and that include an automatic installation function may be downloaded from a Web page on the Internet, which is accessed by using the browser of the client computer, in a recording medium, such as a hard disk.

The program code composing the programs according to the embodiments of the present invention may be divided into multiple files that are downloaded from different Web pages. In other words, the present invention is embodied by the Web server from which multiple users download the program files realizing the functions according to the embodiments of the present invention in the computer.

The programs according to the embodiments of the present invention, which are encrypted and stored in a storage medium such as a CD-ROM, may be distributed to users. In this case, the users satisfying predetermined conditions may download cryptographic-key information for deciphering the code from a Web page over the Internet and may execute and install the programs deciphered by using the downloaded cryptographic-key information in the computer.

The computer that executes the readout programs realizes the functions of the embodiments described above. In addition, the OS or the like running on the computer may execute all or part of the actual processing based on instructions in the programs to realize the functions of the embodiments described above.

Alternatively, after the programs read out from the recording medium has been written in a memory that is provided in a function expansion board included in the computer or in a function expansion unit connected to the computer, the CPU or the like in the function expansion board or the function expansion unit may execute all or part of the actual processing based on instructions in the programs to realize the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-043581 filed Feb. 23, 2007, which is hereby incorporated by reference herein in its entirety.

What is claimed is:

1. An apparatus comprising:
a document creating unit configured to create a temporary document to be registered and to create separately a document different from the temporary document;
a condition setting unit configured to set a condition used for updating the temporary document to a finally registered document;
a temporarily registered thumbnail image display unit configured to display a thumbnail image of the temporary document, wherein the temporarily registered thumbnail image display unit displays the condition set for the temporary document as the thumbnail image in the thumbnail image of the temporary document;
a condition determining unit configured to determine whether the created document meets the condition set for the temporary document when receiving a request for updating the temporary document with the created document as a finally registered document; and
an updating unit configured to update the temporary document to the finally registered document if the condition determining unit determines that the created document meets the condition.

2. The apparatus according to claim 1, wherein, when the document creating unit creates a plurality of temporary documents, the condition setting unit is configured to set respective conditions used for updating each of the plurality of temporary documents.

3. The apparatus according to claim 1, further comprising:
a folder display unit configured to display a folder where the temporary document is stored,
wherein the temporarily registered thumbnail image display unit displays, as the thumbnail image in the thumbnail image of the temporary document, the condition set for the temporary document stored in a folder selected by a user from among folders displayed by the folder display unit.

4. The apparatus according to claim 1, further comprising:
a finally registered thumbnail image display unit configured to display a thumbnail image of the finally registered document, instead of the thumbnail image of the temporary document, after the updating unit updates the temporary document to the finally registered document.

5. The apparatus according to claim 4, further comprising:
a first identification image displaying unit configured to display a first identification image indicating that the thumbnail image is for the temporary document, in association with the thumbnail image displayed for the temporary document; and
a second identification image displaying unit configured to display a second identification image indicating that the thumbnail image is for the finally registered document, in association with the thumbnail image displayed for the finally registered document,
wherein the second identification image displaying unit displays the second identification image, instead of the first identification image, after the updating unit updates the temporary document to the finally registered document.

6. An apparatus comprising:
a document creating unit configured to create a temporary document to be registered and to create separately a document different from the temporary document;
a condition setting unit configured to set a condition used for updating the temporary document to a finally registered document;
a condition determining unit configured to determine whether the created document meets the condition set for the temporary document when receiving a request for updating the temporary document with the created document as a finally registered document;
an updating unit configured to update the temporary document to the finally registered document with the created document if the condition determining unit determines that the created document meets the condition;
a temporarily replaced document creating unit configured to create a temporarily replaced document for the finally registered document to be replaced when a user specifies a replacement of the finally registered document;
a replacement determination unit configured to determine, when the user performs an operation for replacing the finally registered document with the temporarily replaced document, whether the replacement is enabled on the basis of at least one of information concerning the user and information concerning attributes of the finally registered document and the temporarily replaced document; and
a replacing unit configured to replace the finally registered document with the temporarily replaced document when the replacement determination unit determines that the replacement is enabled.

7. The apparatus according to claim 1, further comprising:
a notifying unit configured to notify that the temporary document cannot be updated to the finally registered document with the created document if the condition determining unit determines that the created document does not meet the condition.

8. The apparatus according to claim 1,
wherein the condition includes at least one of a document type, the number of pages in the document, an order of registration of multiple temporary documents in the finally registered document, an acknowledger of the finally registered document, and a registration deadline of the temporary document in the finally registered document.

9. A method of registering an electronic document, the method comprising steps of:
creating a temporary document to be registered and creating separately a document different from the temporary document;
setting a condition used for updating the temporary document to a finally registered document;
displaying, as a thumbnail image in the thumbnail image of the temporary document, the condition set for the temporary document;
determining whether the created document meets the condition when receiving a request for updating the temporary document with the created document as a finally registered document; and updating the temporary document to the finally registered document with the created document if it is determined that the created document meets the condition.

10. The method according to claim 9, wherein, when a plurality of temporary documents are created, respective conditions for updating each of the plurality of temporary documents are set.

11. A non-transitory computer-readable medium storing a computer program, the computer program causes the apparatus to perform steps of:
creating a temporary document to be registered and creating separately a document different from the temporary document;
setting a condition used for updating the temporary document to a finally registered document;
displaying, as a thumbnail image in the thumbnail image of the temporary document, the condition set for the temporary document;
determining whether the created document meets the condition when receiving a request for updating the temporary document with the created document as a finally registered document; and
updating the temporary document to the finally registered document with the created document if it is determined that the created document meets the condition.

12. A method of registering an electronic document, the method comprising steps of:
creating a temporary document to be registered and creating separately a document different from the temporary document;
setting a condition used for updating the temporary document to a finally registered document;
determining whether the created document meets the condition set for the temporary document when receiving a request for updating the temporary document with the created document;
updating the temporary document to the finally registered document with the created document if it is determined that the created document meets the condition;
creating a temporarily replaced document for the finally registered document to be replaced when a user specifies a replacement of the finally registered document;
determining, when the user performs an operation for replacing the finally registered document with the temporarily replaced document, whether the replacement is enabled on the basis of at least one of information concerning the user and information concerning attributes of the finally registered document and the temporarily replaced document; and
replacing the finally registered document with the temporarily replaced document when it is determined that the replacement is enabled.

13. A non-transitory computer-readable medium storing a computer program, the computer program causes the apparatus to perform steps of:
creating a temporary document to be registered and creating separately a document different from the temporary document;
setting a condition used for updating the temporary document to a finally registered document;
determining whether the created document meets the condition set for the temporary document when receiving a request for updating the temporary document with the created document as a finally registered document;
updating the temporary document to the finally registered document with the created document if it is determined that the created document meets the condition;
creating a temporarily replaced document for the finally registered document to be replaced when a user specifies a replacement of the finally registered document;
determining, when the user performs an operation for replacing the finally registered document with the temporarily replaced document, whether the replacement is enabled on the basis of at least one of information concerning the user and information concerning attributes of the finally registered document and the temporarily replaced document; and
replacing the finally registered document with the temporarily replaced document when it is determined that the replacement is enabled.

* * * * *